United States Patent [19]

Colaco

[11] 3,827,034

[45] July 30, 1974

[54] SEMICONDUCTOR INFORMATION STORAGE DEVICES

[75] Inventor: Stephen Francis Colaco, Manchester, England

[73] Assignee: Ferranti Limited, Hollinwood, Lancashire, England

[22] Filed: Sept. 14, 1972

[21] Appl. No.: 288,910

[52] U.S. Cl. .......... 340/173 CA, 307/238, 307/279, 340/173 R

[51] Int. Cl. ........................ G11c 11/24, G11c 11/40

[58] Field of Search ................................. 340/173 R

[56] References Cited

UNITED STATES PATENTS

| | | | |
|---|---|---|---|
| 3,387,286 | 6/1968 | Dennard | 340/173 CA |
| 3,512,140 | 5/1970 | Yokozawa | 340/173 CA |
| 3,593,037 | 7/1971 | Hoff | 340/173 CA |

*Primary Examiner*—Terrell W. Fears
*Attorney, Agent, or Firm*—Cameron, Kerkam, Sutton, Stowell & Stowell

[57] ABSTRACT

A cell of a monolithic semiconductor memory store comprises a bi-directional bipolar transistor, with a capacitance connected to the collector and, with the bipolar transistor capable of conducting in the reverse direction, the capacitance being charged or not charged to store an information bit in the cell, and switching means, such as a field-effect transistor, which is either switched ON or OFF in accordance with the potential difference across the capacitance, there being associated with the cell reading means arranged to produce an output indicative of whether or not the switching means is conducting.

34 Claims, 6 Drawing Figures

SEMICONDUCTOR INFORMATION STORAGE DEVICES

Figure 1:
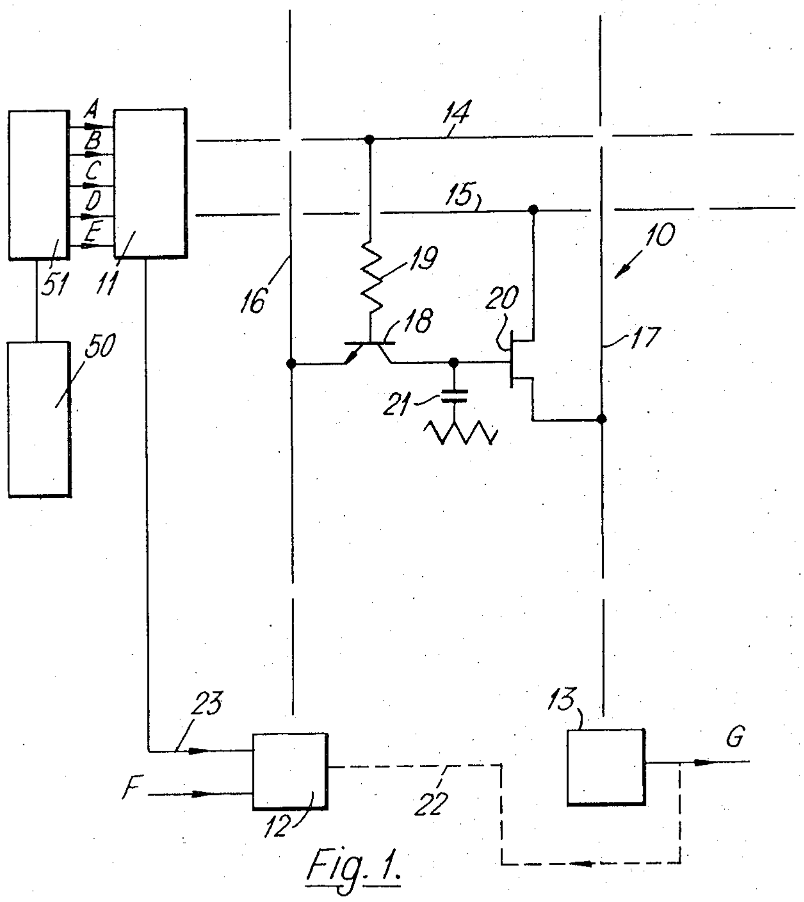

This invention relates to semiconductor information storage devices.

It is an object of the present invention to provide a semiconductor information storage device of a novel and advantageous construction.

According to the present invention a semiconductor information storage device has a plurality of cells each to store an information bit, each cell comprising a bipolar transistor capable of conducting in both the forward and the reverse directions, the transistor having a significant current gain factor in both directions, a capacitance connected to the collector of the transistor and switching means controlled by the potential difference across the capacitance, there being associated with the cell, writing means to charge the capacitance with the transistor conducting in the reverse direction, in response the writing means controlling the flow of current between the switching means and reading means, the reading means providing an output indicative of the conductive condition of the switching means.

In this specification the terms "collector" and "emitter" are used to refer to the collector and emitter of a bi-directional. transistor when capable of conducting in the forward direction.

When the transistor is capable of conducting in the reverse direction, the writing means either charges the capacitance or not in order to write into the cell the information bit to be stored. The output of the reading means is representative of the information bit stored in the cell by indicating whether or not the capacitance is charged.

The switching means may comprise a field-effect transistor, the gate of the field-effect transistor being connected to the collector of the bipolar transistor.

According to another aspect the present invention comprises a semiconductor information storage device having a plurality of cells each to store an information bit, each cell comprising a bipolar transistor capable of conducting in both the forward and the reverse directions, the transistor having a significant current gain factor in both directions, a capacitance connected to the collector of the transistor, and switching means controlled by the potential difference across the capacitance, there being associated with the cell, write enabling means, writing means, read enabling means and reading means, the write enabling means being connected to the base of the transistor, the writing means being connected to the emitter of the transistor and both the read enabling means and the reading means being connected to the switching means, the switching means controlling the flow of current between the reading means and the switching means, the arrangement being such that, when the cell is to be selected for writing an information bit into the cell the potential level of the base of the transistor is raised from a low to a high value by the write enabling means, an information bit then being stored in the cell in response to one of two different possible outputs of the writing means, in response to a predetermined output the emitter potential being raised by the writing means, charging the capacitance with the transistor conducting in the reverse direction, and the read enabling means has two possible states, the cell being selected for reading a stored information bit from the cell in response to the read enabling means being in a predetermined one of the states, if the switching means is in a conductive condition a significant current flowing between the reading means and the switching means with the read enabling means in one of the two possible states, the reading means detecting such a current flow and in response providing one of two different possible outputs, the output of the reading means provided being indicative of the conductive condition of the switching means.

The semiconductor information storage device may comprise a regular, rectangular array of cells, the cells being arranged in columns and rows. Such an information storage device may be provided with two orthogonally-arranged series of substantially parallel lines, each series of lines comprising co-operating pairs of lines, with each cell of the device being connected to a pair of co-operating lines of both series, a co-operating pair of lines of one series being connected to each cell of an associated column of the array of cells, different co-operating pairs of lines of the series being connected to different columns, and a co-operating pair of lines of the other series being connected to each cell of an associated row of the array of cells, different co-operating pairs of lines of the series being connected to different rows. Thus, each co-operating pair of lines of one series may comprise a WRITE line connecting the emitter of the bipolar transistor of the associated cell to the writing means, and a READ line connecting the switching means of the associated cell to the reading means, different identical writing means being connected to different WRITE lines, and different identical reading means being connected to different READ lines, and each co-operating pair of lines of the other series comprise a WRITE SELECT line connecting the base of the bipolar transistor of the associated cell to the write enabling means, and a READ SELECT line connecting the switching means of the associated cell to the read enabling means, different write enabling means being connected to different WRITE SELECT lines, and different identical read enabling means being connected to different READ SELECT lines.

There may be provided refresh means associated with each cell to re-write a stored information bit. In one form the write enabling means and the read enabling means associated with each cell have a common arrangement, and the writing means is connected to the reading means, whereby in response to the cell being selected a stored information bit is read from the cell by the reading means unless the writing means causes a different information bit to be written into the cell, and in response to the stored information bit being read from the cell the writing means is caused to rewrite the stored information bit into the cell. Means may also be provided whereby for each cell the stored information bit is re-written repetitively.

The reading means may comprise an amplifier having a transistor, with the base of the transistor being connected to the switching means, and the arrangement being such that the conductive condition of the amplifier transistor is indicative of the conductive condition of the switching means. In an arrangement in which the amplifier transistor is non-conducting when the switching means is conducting, the base of the amplifier transistor may be connected to associated base drive means providing a stable reference current level to which the base current level is reduced when the amplifier transistor is non-conducting. Thus, the amplifier transistor detects changes in the current flow through the switching means in relation to the stable reference current level provided by the base drive means. When the switching means comprises a field-effect transistor, the base drive means of the amplifier transistor may include an identical field-effect transistor.

Each cell may be formed in a semiconductor body comprising an epitaxial layer of one conductivity type on a substrate of the same conductivity type, the bi-directional transistor of the cell having a collector of the opposite conductivity type comprising both a heavily doped isolation barrier for the transistor and a heavily doped buried layer at the interface between the epitaxial layer and the substrate, the isolation barrier extending through the epitaxial layer into contact with the buried layer, and the capacitance of the cell being provided by the P-N junction between the collector and parts of the semiconductor body around the collector and remote from the base. Thus, the transistor comprises a so-called collector-diffusion-isolation transistor.

When the switching means comprises a field-effect transistor, and each cell is formed in a semiconductor body in an epitaxial layer of one conductivity type on a substrate of the same conductivity type, the bi-directional transistor of the cell may have a collector of the opposite conductivity type comprising part of a heavily doped isolation barrier and part of a heavily doped buried layer at the interface between the epitaxial layer and the substrate, the isolation barrier extending through the epitaxial layer into contact with the buried layer, and the field-effect transistor may have a channel at least partially defined by another part of the isolation barrier and by another part of the buried layer. The gate of the field-effect transistor, switching means, may comprise a region of said opposite conductivity type extending within the channel to make ohmic contact at at least one end with the collector of the bi-directional transistor by making ohmic contact with the isolation barrier.

A plurality of cells of the storage device may be formed in a single semiconductor body. Other parts of the storage device, for example, the writing means and the reading means, also may be formed in the semiconductor body.

Figure 2:
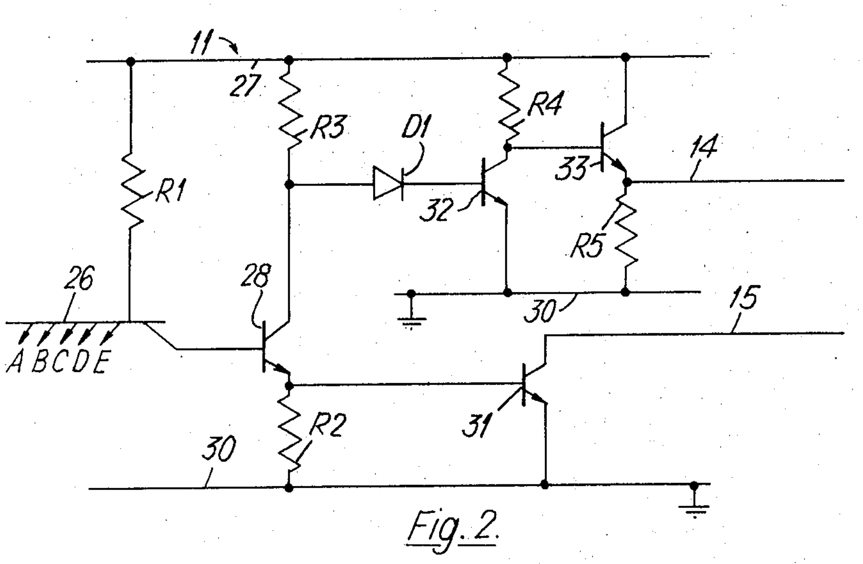
Figure 3:
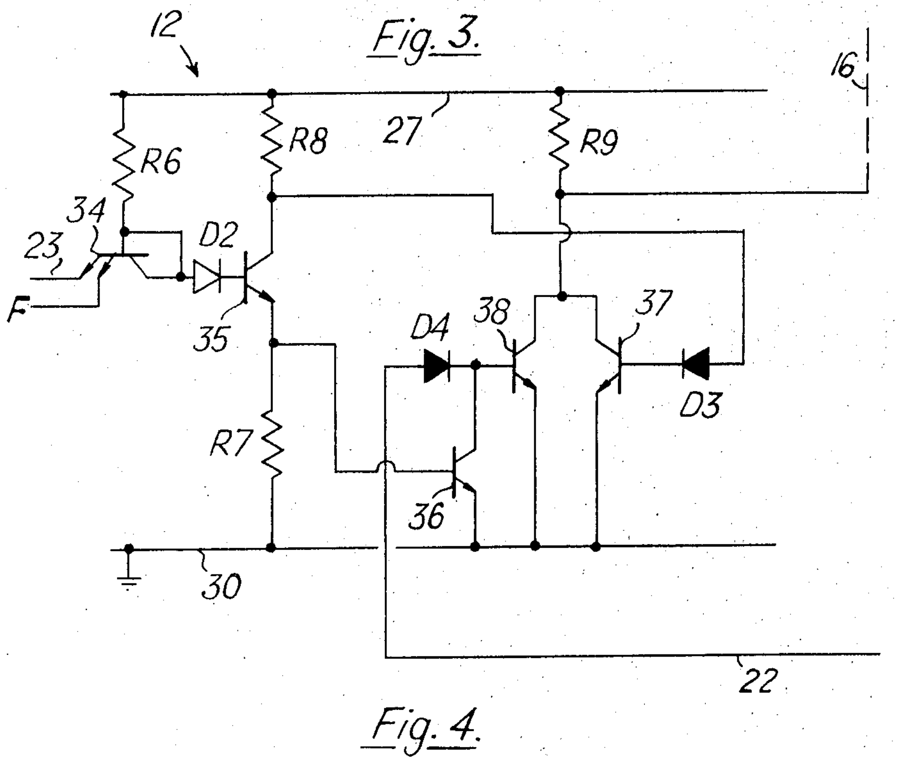
Figure 4:
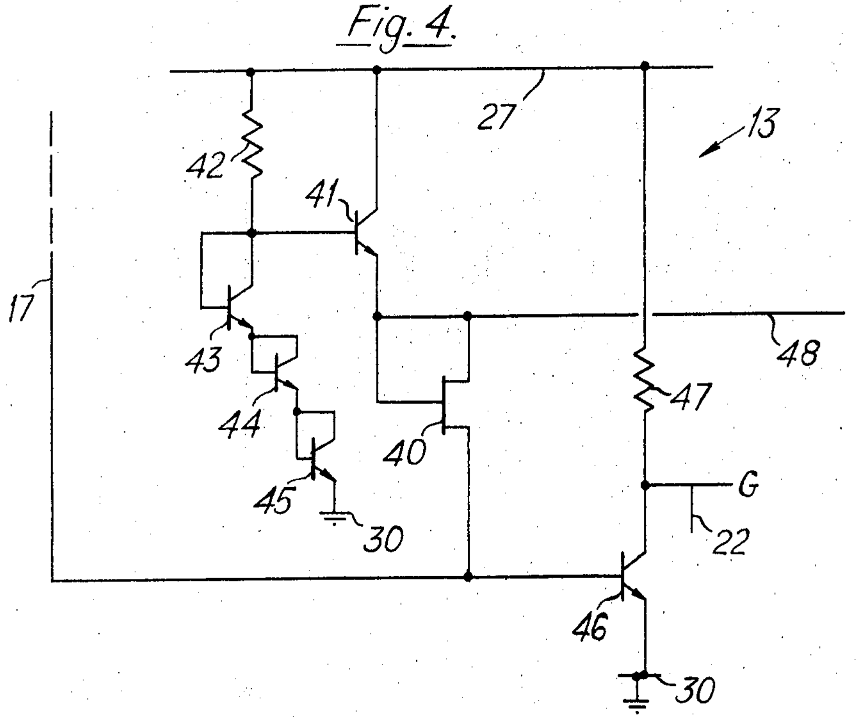
Figure 5:
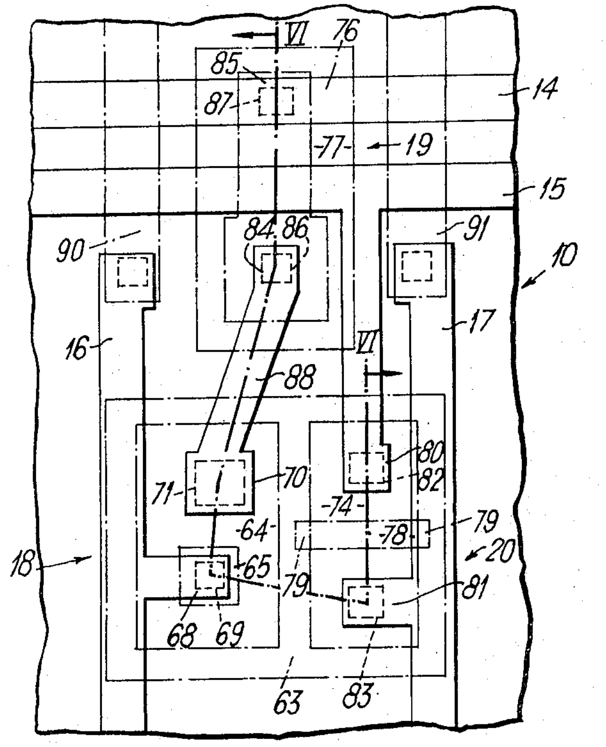
Figure 6:
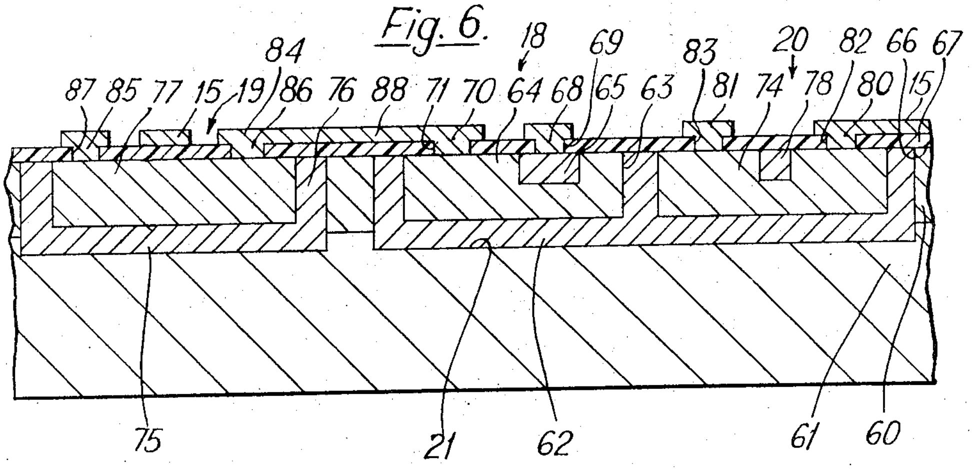

The present invention will now be described by way of example with reference to the accompanying drawings, in which FIG. 1 is a circuit diagram representing part of one embodiment of a semiconductor information storage device according to the present invention, the storage device having an array of cells, the Figure indicating the arrangement of one cell of the array within the device, FIGS. 2, 3 and 4 are circuit diagrams respectively, of write/read enabling means, writing means and reading means associated with the cell, FIG. 5 is a diagrammatic plan view of the cell when embodied in a semiconductor body, and FIG. 6 is a section on the line $\overline{VI}$ - $\overline{VI}$ of FIG. 5.

FIG. 1 represents part of a semiconductor information storage device having a regular, rectangular array of cells 10, the Figure indicating the arrangement of one cell 10 of the array in relation to associated write/-read enabling means 11, writing means 12 and reading means 13. The write/read enabling means 11 is connected to the cell 10 by a co-operating pair of lines comprising a WRITE SELECT line 14 and a READ SELECT line 15. The writing means 12 is connected to the cell 10 by a WRITE line 16, and the reading means 13 is connected to the cell 10 by a READ line 17, the WRITE line 16 and the READ line 17 also comprising a co-operating pair of lines. The WRITE SELECT and READ SELECT lines 14 and 15 are orthogonally arranged in relation to the WRITE line 16 and the READ line 17. The write/read enabling means 11 has a group of inputs A, B, C, D and E and, in response to an appropriate signal at these inputs, the write/read enabling means 11 causes the cell 10 to be selected either for writing an information bit into the cell or for reading a stored information bit from the cell. The signal received by the inputs A, B, C, D and E initially is in coded form, as referred to in greater detail below. The writing means 12 has an input F at which is received a signal representative of an information bit to be written into the cell 10, when required. The reading means 13 has an output G at which is provided, when required, a signal representative of the information bit stored in the cell 10.

The cell 10 comprises a bi-directional, bipolar, N-P-N transistor 18 having a significant current gain factor in both the forward and reverse directions, an isolating resistor 19 connected between the base of the transistor 18 and the WRITE SELECT line 14, and a P-channel junction field-effect transistor, switching means, 20 with the gate of the field-effect transistor 20 connected to the collector of the bipolar transistor 18, the source connected to the READ SELECT line 15 and the drain connected to the READ line 17. The emitter of the bipolar transistor 18 is connected to the WRITE line 16. A capacitance 21, provided within the cell 10 in a manner described in greater detail below, has one equivalent electrode connected to a point between the collector of the bipolar transistor 18 and the gate of the field-effect transistor 20. The other equivalent electrode of the capacitance 21, during the normal operation of the storage device, is maintained at the highest negative potential level associated with the device.

An information bit "1" is considered to be stored in the cell 10 when the capacitance 21 is charged, there being a significant potential difference across the capacitance, and an information bit "0" is considered to be stored in the cell when the capacitance 21 is not so charged; or vice versa. Thus, it may be considered that only a "1" is to be written into the cell 10, the cell merely remaining uncharged when a "0" is to be written into the cell. The output of the reading means 13 is representative of the information bit stored in the cell 10 by indicating whether or not the capacitance 21 is charged.

The cell 10 is selected for writing an information bit into the cell by the write/read enabling means 11, in response to a signal at the group of inputs A, B, C, D and E, raising the potential level of the WRITE SELECT line 14, and hence also the base of the bipolar transistor 18, from a low positive value to a high positive value. Thus, the bipolar transistor 18 is capable of conducting, in either the forward or reverse directions.

A "1" information bit then may be written into the cell 10 by the writing means 12, in response to a signal at the input F, raising the potential level of the WRITE line 16, and hence also the emitter of the bipolar transistor 18, from zero to a high positive value, to cause the bipolar transistor to conduct in the reverse direction. The current flowing through the transistor causes the capacitance 21 to be charged. A "0" information bit may be written into the cell merely by the writing means 12 not raising the potential level of the emitter of the bipolar transistor 18 so that the transistor does not conduct in the reverse direction, and the capacitance 21 does not become charged. Thus, an information bit is stored in the cell 10 by either charging the capacitance 21 or not when the potential level of the WRITE SELECT line 14 is raised, respectively, by providing or not providing a positive-going pulse on the WRITE line 16.

When the capacitance 21 is charged the equivalent electrode connected between the collector of the bipolar transistor 18 and the gate of the field-effect transistor 20, and hence also the gate of the field-effect transistor, is at a higher potential level than when the capacitance is not charged. The arrangement is such that field-effect transistor, switching means, 20 is switched OFF, i.e., is not capable of conducting, when the capacitance 21 is charged, and is switched ON, i.e., is capable of conducting, when the capacitance 21 is not charged.

Subsequently, when the cell 10 is unselected, the signal at the group of inputs A, B, C, D and E is removed, and the signal at the input F of the writing means 12 is removed, the base of the bipolar transistor 18 returns to a low potential level, the emitter returns to zero potential, and the transistor 18 is not capable of conducting. If the capacitance 21 is charged a current cannot flow through either the bipolar transistor 18 or the field-effect transistor 20 to discharge the capacitance.

The capacitance 21 can be discharged, other than by current leakage therefrom, only by the bipolar transistor 18 conducting in the forward direction. The capacitance will be so discharged when the bipolar transistor 18 is capable of conducting in either the forward or the reverse directions due to the write/read enabling means 11 raising the potential level of the base from a high to a low potential level. Thus, the cell 10 is cleared before the writing in of a new information bit, and it is not necessary to employ a separate ensure procedure.

The read enabling means of the write/read enabling means 11 is capable of being in two possible states. When it is required to read a stored information bit from the cell 10, in response to a signal at the group of inputs A, B, C, D and E, the write/read enabling means 11 causes the cell to be selected by the read enabling means changing its state and causing the lowering of the potential level of the READ SELECT line 15, and hence also the source of the field-effect transistor, switching means, 20 from a high positive value to zero. If the field-effect transistor 20, is switched ON current flows from the READ line 17 through the field-effect transistor 20. If the field-effect transistor 20 is switched OFF no such current flow occurs. The reading means 13 is arranged to provide a signal on the output G in response to such a current flow from the READ line 17 and, hence, provides an indication of whether or not the capacitance 21 is charged when the potential level of the READ SELECT line 15 is lowered. Because no current flows to the gate of the field-effect transistor, switching means, 20 from the capacitance 21 the reading operation is non-destructive of the information stored in the cell 10.

No current flows from the base of the bipolar transistor 18 of the cell during the reading operation.

The field-effect transistor, switching means, 20 is required to have a high impedance when switched OFF, and a substantially lower impedance when switched ON. The impedance of the field-effect transistor is proportional to the voltage applied to the gate. Hence it is desirable that there is as great a difference as possible between the potential levels of the equivalent electrode of the capacitance 21, between the collector of the bipolar transistor 18 and the gate of the field-effect transistor 20, when the capacitance 21 is charged and is not charged. However, the magnitude of the capacitance 21 need not be higher than may be provided conveniently in a semiconductor body, because no current flows to the gate of the field-effect transistor 20 from the capacitance.

When the capacitance 21 is charged the charge inadvertently leaks away through the semiconductor body in which the information storage device is formed. Thus, it is necessary to refresh periodically the information bit stored in the cell. If the stored information bit is a "O" the capacitance 21 merely remains uncharged during the refreshing action. In the illustrated arrangement refreshing means is combined with the writing means 12, and the output of the reading means 13, when the capacitance 21 is charged, is fed back to the writing means 12 on a line, indicated in broken line form at 22 in FIG. 1. Hence, the information bit stored in the cell 10 is re-written by refresh means of the writing means each time the stored information bit is read.

As shown in FIG. 2, the write/read enabling means 11 has a part common to both the write enabling means and the read enabling means, comprising a five-input AND gate in the form of a multi-emitter transistor 26, each emitter being connected to one of the group of inputs A, B, C, D and E of the write/read enabling means 11. The base of the transistor 26 is connected to a supply rail 27 via a resistor R1, and the collector is connected to the base of a transistor 28. The emitter of the transistor 28 is connected to a rail 30 maintained at zero potential via a resistor R2 and the collector is connected to the rail 27 via a resistor R3.

The read enabling means is completed by a transistor 31 the base of which is connected to the emitter of the transistor 28, the emitter is connected to the rail 30 and the collector is connected to the READ SELECT line 15.

The write enabling means is completed by a transistor 32 the base of which is connected via a diode D1 to the collector of the transistor 28. The emitter of the transistor 32 is connected to the rail 30, and the collector is connected both to the rail 27 via a resistor R4, and to the base of a transistor 33. The collector of the transistor 33 is connected to the rail 27, and the emitter is connected both to the rail 30 via a resistor R5, and to the WRITE SELECT line 14.

Thus, when each input A, B, C, D and E is at a high potential level, to address the cell 10, the WRITE SELECT line 14 is at a high potential level and the READ SELECT line 15 is at zero potential. The diode D1, however, causes a delay in the write enabling means, and so the stored information bit in the cell 10 may be read from the cell by the reading means 13, then rewritten into the cell by the writing means 12, unless a different information bit is to be written into the cell.

As shown in FIG. 3, the writing means 12 comprises a two-input gate in the form of a multi-emitter transistor 34, the base of the transistor is connected both to the collector and via a resistor R6 to the rail 27. The inputs are connected to a lines 23 and to the input F of the writing means. The collector is also connected via a diode D2 to the base of a transistor 35. The emitter of the transistor 35 is connected both to the rail 30 by a resistor R7, and to the base of a transistor 36. The collector of the transistor 35 is connected both to the rail 27 via a resistor R8, and to the base of a transistor 37 via a diode D3. The emitter of the transistor 36 is connected to the rail 30, as also are the emitters of the transistor 37 and a transistor 38. The collector of the transistor 36 is connected to the base of the transistor 38. The collectors of transistors 37 and 38 are connected both to the rail 27 via a resistor R9, and to the WRITE line 16. The base of the transistor 38 is also connected to the line 22 via diode D4.

The writing means 12, thus, includes refresh means which, when the cell is selected, causes the stored information bit read by the reading means 13, and fed back to the writing means 12 on line 22, to be rewritten into the cell. However, when a write-enable signal is received on the line 23 the refresh means is disabled by logic circuitry, and an appropriate signal on the input F causes a different information bit to be written into the cell by the writing means 12.

As shown in FIG. 4, the reading means 13 comprises a P-channel field-effect transistor 40, identical with the field-effect transistor, switching means, 20. Both the source and the gate of the field-effect transistor 40 are connected to a stabilised power supply comprising a bipolar transistor 41, the collector of which is connected to the supply rail 27, the emitter is connected to the field-effect transistor 40, and the base is connected to the supply rail 27 via a resistor 42. The base of the transistor 41 is held at a stabilised, predetermined potential level by also being connected to the rail 30 maintained at zero potential via three diodes comprising three transistors 43, 44 and 45 each with their collector-base P-N junction shorted. The current density in the diodes 43, 44 and 45 is chosen to compensate for any variation of the base-emitter voltage of the transistor 41 with temperature.

The drain of the field-effect transistor 40 is connected to the READ line 17 and also to the base of a transistor 46. The emitter of the transistor 46 is connected to the rail 30 maintained at zero potential, and the collector is connected both to the supply rail 27 via a resistor 47, and to the output G of the reading means 13. Thus, the impedance of the field-effect transistor, switching means, 20 is compared with the impedance of the identical field-effect transistor 40. When the field-effect transistor, switching means, 20 is switched OFF, having a high impedance, the capacitance 21 being charged, the transistor 46 is switched ON and the output G is at a low potential level. When the field-effect transistor, switching means, 20 is switched ON it has a low impedance, the capacitance 21 not being charged. Then, when the potential level of the READ SELECT line 17 is reduced to zero, the base current level of the transistor 46 is reduced and this transistor is switched OFF, and the output G is at a high potential level. The field-effect transistor 40 provides a stable reference current level to which the base current level of the transistor 46 is reduced to switch OFF the transistor 46. The input of the reading means 13 is effectively a virtual earth reference point of an amplifier, and the voltage variation on the READ line 17 is small so that the capacitance of the READ line has little effect on the speed of operation of the reading means 13.

The transistor 46 will be switched ON both at all times when the field-effect transistor, switching means, 20 is switched OFF and when the field-effect transistor, switching means, 20 is switched ON but the cell 10 is not addressed. A positive-going pulse is received at the output G in response to both the capacitance 21 not being charged and the cell being addressed.

The refreshing means of the writing means is connected by the line 22 to the output G.

The stabilised power supply, comprising the transistors 41, 43, 44 and 45 and the resistor 42, is shared by each reading means 13 associated with the same row of cells 10 of the array of cells, the other reading means being connected to the stabilised power supply by a line 48 connected to the emitter of the transistor 41.

The provision of the field-effect transistor 40 as the base drive for the transistor 46 in the reading means 13 ensures that the impedance of the base drive is the same as that of the field-effect transistor, switching means, 20. Further, effects due to temperature changes during the operation of the storage device, and also inadvertent variations in the parameters of these components of the cell 10 and the reading means 13, during the fabrication of the storage device, are rendered negligible.

The illustrated information storage device comprises a regular, rectangular array of cells 10, the cells being arranged in columns and rows, and two orthogonally-arranged series of substantially parallel lines. Each series of lines comprises co-operating pairs of lines, with each cell of the device being connected to a pair of both series. The co-operating pairs of lines of one series comprise the WRITE SELECT and READ SELECT lines 14 and 15, and the co-operating pairs of lines of the other series comprise the WRITE and READ lines 16 and 17.

A co-operating pair of WRITE SELECT and READ SELECT lines 14 and 15 are connected to each cell 10 of an associated row of cells of the array, different co-operating pairs of lines 14 and 15 of the series being connected to different rows. Further, a co-operating pair of WRITE and READ lines 16 and 17 are connected to each cell 10 of an associated column of cells of the array, different co-operating pairs of lines 16 and 17 of the series being connected to different columns. Alternatively, the WRITE SELECT and READ SELECT lines 14 and 15 may be connected to cells of associated rows of cells, and the WRITE and READ lines 16 and 17 may be connected to cells of associated columns of cells. Different identical write/read enabling means 11 are connected to different co-operating pairs of WRITE SELECT and READ SELECT lines 14 and 15, different identical writing means 12 are connected to different WRITE lines 16, and different identical reading means 13 are connected to different READ lines 17.

A row of cells 10 is selected by a coded signal supplied to the semiconductor information storage device causing each input of the group of inputs A, B, C, D and E of the associated write/read enabling means 11 to be at a high potential level. The coded signal is one of a plurality of different possible coded signals which may be supplied, the number of the different possible coded signals being equal to the number of rows of cells of the device, different coded signals causing a different row of cells of the device to be selected. The coded signals are supplied initially by address means, indicated at 50 in FIG. 1, to decoding means 51, the decoding means 51 providing a signal at the inputs A, B, C, D and E of the write/read enabling means associatd with the row of cells to be selected to cause only the transistor 26 of this write/read enabling means to be switched ON.

Because the cells of the array of cells are addressed by rows, information is read in parallel from a row when addressed, and information is written serially into the addressed row of cells.

Further, the charge of the charged capacitances 21 is refreshed by rows. The address means 50, thus, may include a clock pulse generator (not shown), and each row of cells of the array are selected in sequence, a row being addressed at each clock pulse, the address means 50 providing a different coded signal to the decoding means 51 in response to each clock pulse.

The semiconductor information storage device described above easily may be fabricated by a known method in a monolithic semiconductor wafer body. A plan view of the construction of a cell 10 of the device is shown in FIG. 5, and a section on the line VI - VI is shown in FIG. 6.

As shown in FIG. 6, the N-P-N bi-directional, bipolar transistor 18 of the illustrated cell 10 has the so-called collector-diffusion-isolation construction and is formed in a silicon semiconductor body comprising a shallow P-type epitaxial layer 60 on a P-type substrate 61. The surface portion of the epitaxial layer 60 remote from the substrate is of P+ type, being formed by a non-selective diffusion step, for convenience, the P+ type surface portion not being shown. The collector of the transistor comprises both part of a buried N+type layer 62 at the interface between the epitaxial layer 60 and the substrate 61, and part of an N+ type isolation barrier 63 for the transistor, the isolation barrier extending through the epitaxial layer 60 into contact with the buried layer 62. The collector 62, 63 defines a P− type base 63 within the epitaxial layer, and an emitter 65 is formed by the selective diffusion of a suitable impurity into part of the base 64. Contacts are provided on the surface 66 of the epitaxial layer 60 remote from the substrate 61, the contacts extending through apertures in a layer of passivating material 67. The contacts comprise an emitter contact 68 extending through an aperture 69, and a base contact 70 extending through an aperture 71. Such a transistor has a high inverse current gain factor and so is capable of conducting in both the forward and reverse directions. In FIG. 5, in which the passivating layer 67 is not shown, the surface portions of the P-N junctions are indicated by chain-dotted lines. The contacts extend through apertures in the passivating layer indicated by broken lines.

The passivating layer 67 is of silicon oxide and is deposited on the surface 66 of the epitaxial layer 60 from a suitable reaction atmosphere. The silicon oxide 67 is employed as a diffusion-resistant material during the diffusion steps employed in forming the cell, and is then retained on the surface 66 for passivation purposes, covering at least the otherwise exposed surface portions of the P-N junctions.

Also included in the cell 10 is the isolating resistor 19 and the junction field-effect transistor 20. These circuit elements are provided in the semiconductor body simultaneously with the provision of the collector-diffusion-isolation transistor 18, and each having a construction closely resembling that of the transistor 18. As shown in FIG. 6, another part of the combination of the buried layer 62 and the isolation barrier 63 defines another P− type region 74 within the epitaxial layer 60, the region 74 comprising the channel of the junction field-effect transistor 20. A further buried layer 75 and isolation barrier 76 combination define a further P− type region 77 within the epitaxial layer 60, the region 77 comprising the resistive channel of the resistor 19. The N+ type gate 78 of the junction field-effect transistor 20 is formed simultaneously with the emitter 65 of the bipolar transistor 18, and is in the form of a region which extends at at least one end into the N+ type isolation barrier 63 as indicated at 79 in FIG. 5. Thus, the gate 78 is in direct ohmic contact with the collector 62, 63 of the bipolar transistor 18. Contacts 80 and 81, which extend, respectively, through apertures 82 and 83 in the passivating layer 67, are provided for the source and drain of the field-effect transistor 20 one such contact 80 and 81 being formed on the channel 74 on either side of the gate 78. Contacts 84 and 85 are provided for resistor 19, and extend through apertures 86 and 87 being formed at either end of the resistive channel 77.

The capacitance 21 of the cell 10, and indicated in FIG. 1, is provided, as shown in FIG. 6, by the P-N junction between the collector 62 of the bipolar transistor 18 of the cell and the parts of the semiconductor body around the collector and remote from the base. The part of the capacitance between the buried layer 62 and the substrate 61 may be increased by providing a heavily doped substrate. Thus, the equivalent electrode of the capacitance 21, connected between the collector of the bipolar transistor 18 and the gate of the field-effect transistor 20, can be considered as being provided within the buried layer 62, and the other equivalent electrode of the capacitance 21 can be considered as being provided within the substrate 61. During the normal operation of the storage device the substrate 61 is maintained at the highest negative potential level associated with the device. The capacitance 21 of the cell discharges slowly due to current leakage across the P-N junction, and hence it is necessary to refresh the information bit periodically in the cell to restore the charge of the capacitance 21 when the capacitance is to be charged.

The contacts of the cell 10 are provided by etching in an appropriate manner an initially — continuous layer of aluminum provided on the silicon oxide passivating layer and within the apertures formed in the passivating layer. The electrical interconnections between constituent circuit elements of the cells, between the cells, and between the cells and other parts of the semiconductor information storage device, and required to be metal conductors, are formed from the metal layer simultaneously with the contacts, and are illustrated by continuous lines in FIG. 5. The metal conductors include the WRITE SELECT line 24 connected to the resistor contact 85, the READ SELECT line 15 connected to drain contact 80 of the field-effect transistor 20, a part of both the WRITE line 16 and the READ line 17, and an electrical inter-connection 88 between the resistor contact 84 and the base contact 70 of the bipolar transistor 18. The remaining parts of the WRITE line 16 and the READ line 17 comprise doped regions 90 and 91 of the epitaxial layer 60 formed simultaneously with the emitter 65 of the bipolar transistor and the gate 78 of the junction field-effect transistor 20. The WRITE SELECT line 14 and the READ SELECT line 15 extend on the passivating layer 67 over the parts of the WRITE line 16 and the READ line 17 comprising the doped regions 90 and 91, hence these regions 90 and 91 comprising cross-unders. Thus, the co-operating pairs of lines comprising the WRITE SELECT line 14 and the READ SELECT line 15, and the WRITE line 16 and the READ line 17 conveniently may be an orthogonal arrangement in relation to each other without the need to provide metal cross-overs.

Hence, the array of cells 10 and the associated, orthogonally arranged series of pairs of lines 14 and 15 and 16 and 17 may be provided conveniently in the semiconductor information storage device.

The cells of the regular, rectangular array of cells of the information storage device are fabricated simultaneously in the semiconductor body, and other parts of the information storage device, for example, the write/read enabling means, the writing means and the reading means also may be fabricated in the same semiconductor body and at the same time.

The fabrication of the semiconductor information storage device is facilitated by the collector-diffusion-isolation bipolar transistors, the field-effect transistors, and the resistors of the device having substantially the same construction as each other. However, the circuit elements of the device, conveniently, may have any suitable construction.

The one particular embodiment according to the present invention the bipolar transistor 18 of the cell 10 has a current gain factor of thirty in the forward direction and a current gain factor of ten in the reverse direction. The capacitance 21 is 3 picofarads. The time to charge, and to discharge, the capacitance 21 of the cell is less than 10 nanoseconds. A decay of 1 volt across the capacitance takes 200 milliseconds at 25°C due to leakage of charge. Hence the refresh time required at a temperature of 100°C is approximately 1 millisecond. A potential level of +3 volts causes the field-effect transistor, switching means, 20 to switch OFF. For the device, the access time, i.e., the time from address to data out, is 70 nanoseconds; the read/refresh time is 100 nanoseconds; and the cycle time i.e., the time for read and write operations, is 200 nanoseconds. Power is only consumed by the device during writing and reading steps (including refreshing steps), and can be removed when the device is not addressed. The power consumed by a 1,024 bit memory device is 350 milliwatts during a writing or reading step, and 25 milliwatts by an associated device selection circuit when the device is not addressed.

The provision of a complex information storage device is facilitated by employing cells each with a bipolar transistor of the collector-diffusion-isolation construction, because such a transistor may occupy a smaller part of the contact-bearing surface 66 of the semiconductor body in which the device is formed, and requires fewer processing steps in its fabrication, than most other known forms of bipolar transistor. However, in a semiconductor information storage device according to the present invention the bi-directional transistors may have any convenient construction, and not necessarily the collector-diffusion-isolation construction of the illustrated arrangement. For example, the bi-directional bipolar transistors may be of the Isoplanar, vee-isolation with polysilicon backfill (VIP) or vertical anisotropic etch (V-ATE) construction. Isoplanar, V-ATE and VIP bipolar transistors, like CDI transistors, have a base provided in an epitaxial layer of a semiconductor body. Hence, each such transistor has both a symmetrical and planar construction, a collector-to-substrate capacitance, is bi-directional in operation and may be employed as a bi-directional operating element in forming a bipolar dynamic memory cell through which a capacitance is charged and discharged to store an information bit. However, the parasitic capacitance of Isoplanar, V-ATE and VIP transistors is not as large as the parasitic capacitance present in a CDI construction. Thus, the CDI bipolar transistor construction is preferable for dynamic bipolar cells, because of its significantly larger parasitic or collector-to-substrate capacitance. Where Isoplanar, V-ATE or VIP constructions are employed, the available capacitance could be supplemented if necessary by the inclusion of a discrete capacitor provided in or on the semiconductor body in the monolithic structure. Such capacitors may be formed by conventional integrated circuit fabrication techniques and, may be for example, a thin film capacitor.

The provision of a non-selective P+ type portion (not shown) of the epitaxial layer may be omitted, but this portion helps to stabilise the resistors of the storage device, helps to prevent surface inversion, and causes the gain bandwidth product of the transistors to be increased.

The arrangement of each cell of the semiconductor information storage device according to the present invention may be such that the field-effect transistor, switching means, 20 is switched ON when the capacitance is charged, and is switched OFF when the capacitance is not charged, the field-effect transistor having a channel or N conductivity type. The field-effect transistor of the reading means 13 also may have an N−type channel.

Further, the arrangement may be such that the current flow is into the READ line 17 from the read enabling means when the field-effect transistor, switching means, 20 is switched OFF and the cell 10 is selected by the write/read enabling means 11, the output of the reading means 13 being indicative of whether or not such a current flow occurs when the cell is selected.

The writing means 12 may be such that an information bit is capable of being written into an associated cell by the capacitance of the cell being charged in response to the receipt by the input F of the writing means of a negative-going pulse.

The junction field-effect transistors of the cells and of the reading means may be replaced by insulated-gate field-effect transistors.

The bipolar transistors of the cells 10 may be P-N-P type instead of N-P-N type. Thus, the capacitance 21 is charged to a high positive potential instead of a high negative potential in order to store an information bit in the cell. The arrangement in this case is such that current flows through the bipolar transistor 18 of each cell 10 when the bipolar transistor is conducting in the forward direction to charge the capacitance, and current flows through the bipolar transistor when it is conducting in the reverse direction to discharge the capacitance.

It is advantageous to have the capacitance of each cell connected to the collector of the bi-directional transistor because a large capacitance may then be provided in a convenient manner, and the required connection to a point maintained at zero potential may be provided in a simple way.

What we claim is:

1. A semiconductor information storage device having a plurality of cells each to store an information bit, each cell comprising a bipolar transistor capable of conducting in both the forward and the reverse direction, the transistor having a significant current gain factor in both directions, a capacitance connected to the collector of the transistor, and switching means controlled by the potential difference across the capacitance, there being associated with the cell, writing means to charge the capacitance with the transistor conducting in the reverse direction, in response the switching means controlling the flow of current between the switching means, and reading means, the reading means providing an output indicative of the conductive condition of the switching means.

2. A semiconductor information storage device as claimed in claim 1 in which the switching comprises a field-effect transistor, the gate of the field-effect transistor being connected to the collector of the bipolar transistor.

3. A semiconductor information storage device having a plurality of cells each to store an information bit, each cell comprising a bipolar transistor capable of conducting in both the forward and the reverse directions, the transistor having a significant current gain factor in both directions, a capacitance connected to the collector of the transistor and switching means controlled by the potential difference across the capacitance, there being associated with the cell, write enabling means, writing means, read enabling means and reading means, the write enabling means being connected to the base of the transistor, the writing means being connected to the emitter of the transistor, and both the read enabling means and the reading means being connected to the switching means, the switching means controlling the flow of current between the reading means and the switching means, the arrangement being such that, when the cell is to be selected for writing an information bit into the cell the potential level of the base of the transistor is raised from a low to a high value by the writing enabling means, an information bit then being stored in the cell in response to one of two different possible outputs of the writing means, in response to a predetermined output the emitter potential being raised by the writing means, charging the capacitance with the transistor conducting in the reverse direction, and the read enabling means has two possible states the cell being selected for reading a stored information bit from the cell in response to the read enabling means being in a predetermined one of the states, if the switching means is in a conductive condition a significant current flowing between the reading means and the switching means with the read enabling means in one of the two possible states, the reading means detecting such a current flow and in response providing one of two different possible outputs, the output of the reading means provided being indicative of the conductive condition of the switching means.

4. A semiconductor information storage device as claimed in claim 3 having a regular, rectangular array of cells, the cells being arranged in columns and rows.

5. A semiconductor information storage device as claimed in claim 4 having two orthogonally - arranged series of substantially parallel lines, each series of lines comprising co-operating pairs of lines, with each cell of the device being connected to a pair of co-operating lines of both series, a co-operating pair of lines of one series being connected to each cell of an associated column of the array of cells, different co-operating airs of lines of the series being connected to different columns and different co-operating pairs of lines of the other series being connected to each cell of an associated row of the array of cells, different co-operating pairs of lines of the series being connected to different rows.

6. A semiconductor information storage device as claimed in claim 5 in which each co-operating pair of lines of one series comprise a WRITE line connecting the emitter of the bipolar transistor of the associated cell to the writing means, and a READ line connecting the switching means of the associated cell to the reading means, different identical writing means being connected to different WRITE lines, and different identical reading means being connected to different READ lines, and each co-operating pair of lines of the other series comprise a WRITE SELECT line connecting the base of the bipolar transistor of the associated cell to the write enabling means, and a READ SELECT line connecting the switching means of the associated cell to the read enabling means, different write enabling means being connected to different WRITE SELECT lines, and different identical read enabling means being connected to different READ SELECT lines.

7. A semiconductor information storage device as claimed in claim 5 in which there is provided refresh means associated with each cell to re-write a stored information bit.

8. A semiconductor information storage device as claimed in claim 7 in which the write enabling means and the read enabling means associated with each cell have a common arrangement, and the writing means is connected to the reading means, whereby in response to the cell being selected a stored information bit is read from the cell by the reading means unless the writing means causes a different information bit to be written into the cell, and in response to the stored information bit being read from the cell the writing means is caused to re-write the stored information bit into the cell.

9. A semiconductor information storage device as claimed in claim 7 in which means is provided whereby for each cell the stored information bit is re-written repetitively.

10. A semiconductor information device as claimed in claim 3 in which the switching means comprises a field-effect transistor, the gate of the field-effect transistor being connected to the collector of the bipolar transistor.

11. A semiconductor information storage device as claimed in claim 3 in which the reading means comprises an amplifier having a transistor with the base of the transistor connected to the switching means, and the arrangement being such that the conductive condition of the amplifier transistor is indicative of the conductive condition of the switching means.

12. A semiconductor information storage device as claimed in claim 11 in which the amplifier transistor is non-conducting when the switching means is conducting, the base of the amplifier transistor is connected to associated base drive means providing a stable reference current level to which the base current level is reduced when the amplifier transistor is non-conducting.

13. A semiconductor information storage device as claimed in claim 12 in which the switching means comprising a field-effect transistor, and the base drive means of the amplifier transistor includes an identical field-effect transistor.

14. A semiconductor information storage device having a plurality of cells each to store an information bit, each cell comprising a bipolar collector-diffusion-isolation transistor capable of conducting in both the forward and the reverse directions, the transistor having a significant current gain factor in both directions, a capacitance connected to the collector of the transistor and switching means controlled by the potential difference across the capacitance, write enabling means, writing means, read enabling means and reading means operatively associated with the cell, the write enabling means being connected to the base of the transistor, the writing means being connected to the emitter of the transistor, and both the read enabling means and the reading means being connected to the switching means, the switching means controlling the flow of current between the reading means and the switching means, the arrangement being such that, when the cell is to be selected for writing an information bit into the cell the potential level of the base of the transistor is raised from a low to a high value by the writing enabling means, an information bit then being stored in the cell in response to one of two different possible outputs of the writing means, in response to a predetermined output the emitter potential being raised by the writing means, charging the capacitance with the transistor conducting in the reverse direction, and the read enabling means has two possible states, the cell being selected for reading a stored information bit from the cell in response to the read enabling means being in a predetermined one of the states, if the switching means is in a conductive condition a significant current flowing between the reading means and the switching means with the read enabling means in one of the two possible states, the reading means detecting such a current flow and in response providing one of two different possible outputs, the output of the reading means provided being indicative of the conductive condition of the switching means, each cell being formed in a semiconductor body comprising an epitaxial layer of one conductivity type on a substrate of the same conductivity type, the bi-directional transistor of the cell having a collector of the opposite conductivity type comprising both a heavily doped isolation barrier for the transistor and a heavily doped buried layer at the interface between the epitaxial layer and the substrate, the isolation barrier extending through the epitaxial layer into contact with the buried layer.

15. A semiconductor information storage device as claimed in claim 14 in which the switching means comprises a field-effect transistor, and each cell is formed in a semiconductor body in an epitaxial layer of one conductivity type, the bi-directional transistor of the cell has a collector of the opposite conductivity type comprising part of a heavily doped isolation barrier and part of a heavily doped buried layer at the interface between the epitaxial layer and the substrate, the isolation barrier extending to the epitaxial layer into contact with the buried layer, and the field-effect transistor has a channel at least partially defined by another part of the isolation barrier and by another part of the buried layer.

16. A semiconductor information storage device as claimed in claim 15 in which the gate of the field-effect transistor, switching means, comprises a region of said opposite conductivity type extending within the channel to make ohmic contact at at least one end with the collector of the bi-directional transistor by making ohmic contact with the isolation barrier.

17. A semiconductor information storage device as claimed in claim 3 in which the plurality of cells are formed in a single semiconductor body.

18. A semiconductor information storage device as claimed in claim 17 in which other parts of the storage device are also formed in the semiconductor body.

19. A semiconductor information storage device as set forth in claim 1 wherein the capacitance of the cell is provided by the P-N junction between the collector and parts of the semiconductor body around the collector and remote from the base.

20. A semiconductor information storage device as set forth in claim 19 wherein the capacitance of the cell connected to the collector is provided by the P-N junction between the collector and parts of the semiconductor body around the collector and remote from the base.

21. A semiconductor information storage device as set forth in claim 19 wherein the capacitance of the cell connected to the collector includes the collector to substrate capacitance of the transistor.

22. A semiconductor information storage device as set forth in claim 19 wherein said bipolar transistor has a base provided in an epitaxial layer and has both a symmetrical and planar construction and said switching means is a field-effect transistor, the gate of the field-effect transistor being connected to the collector of the bipolar transistor.

23. A semiconductor information storage device as set forth in claim 1 wherein said bipolar transistor has a base provided in an epitaxial layer and has both a symmetrical and planar construction and said switching means is a field-effect transistor, the gate of the fieldeffect transistor being connected to the collector of the bipolar transistor.

24. A semiconductor information storage device as set forth in claim 3 wherein said bipolar transistor has a base provided in an epitaxial layer and has both a symmetrical and planar construction and said switching means is a field-effect transistor, the gate of the fieldeffect transistor being connected to the collector of the bipolar transistor.

25. A semiconductor information storage device as set forth in claim 7 wherein said bipolar transistor has a base provided in an epitaxial layer and has both a symmetrical and planar construction and said switching means is a field-effect transistor, the gate of the field-effect transistor being connected to the collector of the bipolar transistor.

26. A semiconductor information storage device as set forth in claim 17 wherein said bipolar transistor has a base provided in an epitaxial layer and has both a symmetrical and planar construction and said switching means is a field-effect transistor, the gate of the field-effect transistor being connected to the collector of the bipolar transistor.

27. A semiconductor information storage device as set forth in claim 13 wherein said bipolar transistor has a base provided in an epitaxial layer and has both a symmetrical and planar construction and a significant collector-to-substrate capacitance.

28. A semiconductor information storage device as set forth in claim 18 wherein said bipolar transistor has a base provided in an epitaxial layer and has both a symmetrical and planar construction and a significant collector-to-substrate capacitance.

29. A semiconductor information storage device as set forth in claim 3 wherein the capacitance of the cell is provided by the P-N junction between the collector and parts of the semiconductor body around the collector and remote from the base.

30. A semiconductor information storage device as set forth in claim 7 wherein the capacitance of the cell is provided by the P-N junction between the collector and parts of the semiconductor body around the collector and remote from the base.

31. A semiconductor information storage device as set forth in claim 17 wherein the capacitance of the cell is provided by the P-N junction between the collector and parts of the semiconductor body around the collector and remote from the base.

32. A semiconductor information storage device as set forth in claim 23 wherein said bipolar transistor is selected from the group consisting of CDI, VIP, V-ATE and Isoplanar constructed transistors.

33. A semiconductor information storage device as set forth in claim 29 wherein said bipolar transistor is selected from the group consisting of CDI, VIP, V-ATE and Isoplanar constructed transistors.

34. A semiconductor information storage device as set forth in claim 23 wherein said bipolar transistor is selected from the group consisting of CDI, VIP, V-ATE and Isoplanar constructed transistors and the capacitance of the cell connected to the collector includes the collector-to-substrate capacitance of the transistor.

* * * * *

PO-1050
(5/69)

UNITED STATES PATENT OFFICE
CERTIFICATE OF CORRECTION

Patent No. 3,827,034 Dated July 30, 1974

Inventor(s) Stephen Francis Colaco

It is certified that error appears in the above-identified patent and that said Letters Patent are hereby corrected as shown below:

On the cover page, insert --[30] Foreign Priority Information - British Application No. 44263/71 filed September 22, 1971--.

Claim 23, column 16, lines 51 and 52, "fieldeffect" should be --field-effect--.

Claim 24, column 16, lines 59 and 60, "fieldeffect" should be --field-effect--.

Signed and sealed this 29th day of October 1974.

(SEAL)
Attest:

McCOY M. GIBSON JR.
Attesting Officer

C. MARSHALL DANN
Commissioner of Patents